(12) United States Patent
Treibach-Heck et al.

(10) Patent No.: US 7,212,301 B2
(45) Date of Patent: May 1, 2007

(54) SYSTEM AND METHOD FOR CENTRALIZED, AUTOMATIC EXTRACTION OF DATA FROM REMOTELY TRANSMITTED FORMS

(75) Inventors: Varda Treibach-Heck, Redwood City, CA (US); Bruce Johnson, Chatsworth, CA (US); Byron G. Caldwell, Los Angeles, CA (US); David Alan Gollom, Los Angeles, CA (US)

(73) Assignee: Call-Tell LLC, Redwood City, CA (US)

( * ) Notice: Subject to any disclaimer, the term of this patent is extended or adjusted under 35 U.S.C. 154(b) by 827 days.

(21) Appl. No.: 10/003,339

(22) Filed: Oct. 31, 2001

(65) Prior Publication Data

US 2003/0084402 A1 May 1, 2003

(51) Int. Cl.
 *G06F 3/12* (2006.01)
 *G06K 1/00* (2006.01)
(52) U.S. Cl. ............... 358/1.15; 358/402; 715/505; 382/173; 382/217
(58) Field of Classification Search ............... 358/1.15, 358/403, 408, 449, 538, 453; 382/176, 305, 382/306, 173, 217; 702/188; 705/32; 715/500, 715/505; 379/100.07, 100.08
See application file for complete search history.

(56) References Cited

U.S. PATENT DOCUMENTS

| | | | | |
|---|---|---|---|---|
| 4,021,777 A * | 5/1977 | Shepard | ...................... | 382/317 |
| 5,001,769 A * | 3/1991 | Reid-Green et al. | ........ | 382/283 |
| 5,231,663 A * | 7/1993 | Earl et al. | .................... | 382/159 |
| 5,416,849 A * | 5/1995 | Huang | ........................ | 382/173 |
| 5,721,940 A * | 2/1998 | Luther et al. | ................ | 715/506 |
| 5,809,167 A * | 9/1998 | Al-Hussein | .................. | 382/190 |
| 5,838,458 A * | 11/1998 | Tsai | ........................... | 358/402 |
| 5,943,137 A * | 8/1999 | Larson et al. | ................ | 358/403 |
| 6,778,703 B1 * | 8/2004 | Zlotnick | ..................... | 382/218 |
| 2003/0083966 A1 * | 5/2003 | Treibach-Heck et al. | ...... | 705/32 |
| 2003/0160828 A1 * | 8/2003 | Treibach-Heck et al. | ... | 345/780 |

* cited by examiner

*Primary Examiner*—Aung S. Moe
*Assistant Examiner*—Dillon Murphy
(74) *Attorney, Agent, or Firm*—Jeffrey Pearce

(57) ABSTRACT

One or more parameters such as time is reported to a center using a form. The center then automatically extracts data from the form and converts it for storage and subsequent processing or review. The form is preferably a physical form, which the sender fills in and then faxes to the center. Image capture, registration, and feature recognition routines are included to enable the center to extract the reported data with no need for data reentry or human intervention. The invention is particularly suitable for employees who need to submit time sheets, expense reports, and the like to an employer, or for automatic analysis of submitted inventory reports, product orders, etc.

1 Claim, 2 Drawing Sheets

FIG. 2

SYSTEM AND METHOD FOR CENTRALIZED, AUTOMATIC EXTRACTION OF DATA FROM REMOTELY TRANSMITTED FORMS

BACKGROUND OF THE INVENTION

1. Field of the Invention

This invention relates to a system and a method for reporting and tracking one or more parameters such as time or sales, or for placing orders, etc., especially where the person or organization that creates the report or order is remote from the person or organization that is to receive and process the report or order.

2. Description of the Related Art

Much of ones work life is tracked and measured. Time cards, time sheets, time clocks and time-tracking software, for example, are features of the modern workplace that are seemingly as unavoidable as the hierarchies that require them. Consequently, following a routine repeated daily by millions in almost every industrialized country, those whose time is to be reported complete a report such as some type of card or sheet or physical or on-screen form. The report is then passed to one or more other people, such as a payroll or billing clerk, a project manager, etc. The data on the report is then usually entered manually into some type of bookkeeping or similar tracking software.

This conventional process is, however, as rife with possibilities for error as it is widespread. For example, every time someone must enter information, be it numerical or textual or both, manually onto paper, there is the possibility of error, since someone else will usually later have to read and interpret what has been written. The likelihood of error is often lessened when using time cards that are punched by machine, but even then the chance of error is not eliminated, because as soon as the data on the card is entered manually into a tracking system, there is a risk of misinterpretation or simply just typing errors. Moreover, even if everyone in the chain of reporting were infallible, the process itself contains an unavoidable inefficiency whenever reported data must be reentered into a tracking system—the very need for data reentry requires both time and an employee to do the reentry.

One way to reduce the need for data reentry would of course be to have the employee enter data himself into the tracking system. The disadvantages of this are, however, plain. First, the employee may not be comfortable with or competent in using the time-tracking software, especially if the software is based on a web browser. Second, even assuming that every reporting employee has convenient access to a suitable computer terminal, it would be wasteful to load multiple copies of the time-tracking software into each terminal. The alternative of having several employees having to share a single instance of the software to report their time, for example, late Because the modern world is full of reports and orders, the problems identified above in the context of reporting time arise in other contexts as well, where other parameters than time must be reported instead of, or in addition to, time. For example, employees must often file expense and travel reports, or sales reports.

Moreover, parameters such as time and expenses are not the only types of information that frequently need to be reported. Employees or affiliates may need to file reports concerning the progress of projects, or the status of inventory, for example, or vendors may wish to send bills quickly in order to speed up the payment process.

Furthermore, similar problems occur even in contexts where the one reporting information is not in any way associated with the recipient of the report. This will often occur in the case of processing of customer orders. As is well known, one option offered by today's technology is on-line ordering via the Internet. However, not all companies have, or wish to have, a web site, and not all potential customers are comfortable with the thought of placing orders over such an insecure channel. Moreover, high-tech, on-line ordering and order processing are not always appropriate. For example, it would in most cases be too time-consuming and tedious to expect several co-workers in an office to have to go on-line and fill in browser-based forms simply to place advanced orders for lunch at one of their favorite restaurants.

What is needed is therefore a system for reporting information such as time worked, expenses, inventory, orders, etc., that is easy to use, that does not require the user to have specialized technology available, that allows for easy verification, that eliminates the need for manual data reentry, and that is readily adaptable to many different reporting contexts. This invention provides such a system, and a related method of operation.

SUMMARY OF THE INVENTION

The invention provides a method, and a corresponding system implementation, for collecting reports, such as time sheets, expense reports, order forms, etc., of at least one parameter, such as time, expenses, order information, and so on. A central server is included for automatically receiving from any of a plurality of senders, via a transmission channel, an electronic representation of an image of a physical form. The form has a plurality of data fields, each corresponding to an indicator of at least a partial value of at least one of the parameters. Software modules are included within a form-processing application for automatically identifying the location of the data fields in the received representation of the image of the form; for automatically extracting from the identified data fields the at least partial values of the corresponding parameters; and for automatically storing the extracted values in a predetermined format in a memory for subsequent processing.

A sender, for example a reporting employee or ordering customer, preferably causes the electronic representation of the image of the physical form to be generated by using a conventional facsimile machine to transmit the report form. This allows the transmission channel to be a standard telephone line.

The stored, extracted values of the reported parameters may also be transferred to an external recipient via a network. All processing of the physical form after transmission by the sender up to and including transfer to the external recipient via the network thereby takes place automatically; this avoids all need for manual data reentry and other intermediate manual processing.

Each data field in the report preferably indicates a quantifiable or itemizable value of a corresponding one of the parameters. Nonetheless, other non-quantifiable and non-itemizable entries such as a signature may also be included on reports. In this case, the central server preferably also stores the received electronic representation of the image of the physical form in the memory so that even the non-quantifiable and non-itemizable entries by the user onto the physical form are made available for subsequent review.

The form-processing application preferably also includes a software module that receives annotations from intended recipients of the form and stores these annotations in the memory along with the stored extracted values of the respective received form.

The form processing application preferably identifies the location of the data fields automatically by performing the following sub-steps: storing an electronic representation of a template of each of a plurality of physical forms; automatically identifying each received form by performing a best-fit comparison of each received electronic representation of the image of the corresponding physical form with the stored electronic representations of the templates; automatically registering the received electronic representation of the received physical form image with the best-fit electronic template representation; and matching the data fields in the received electronic representation of the received physical form image with corresponding data fields in the best-fit electronic template representation.

BRIEF DESCRIPTION OF THE DRAWINGS

FIG. 2 illustrates one of the many types of forms that may be used to report information using the invention.

DETAILED DESCRIPTION

Figure 1:
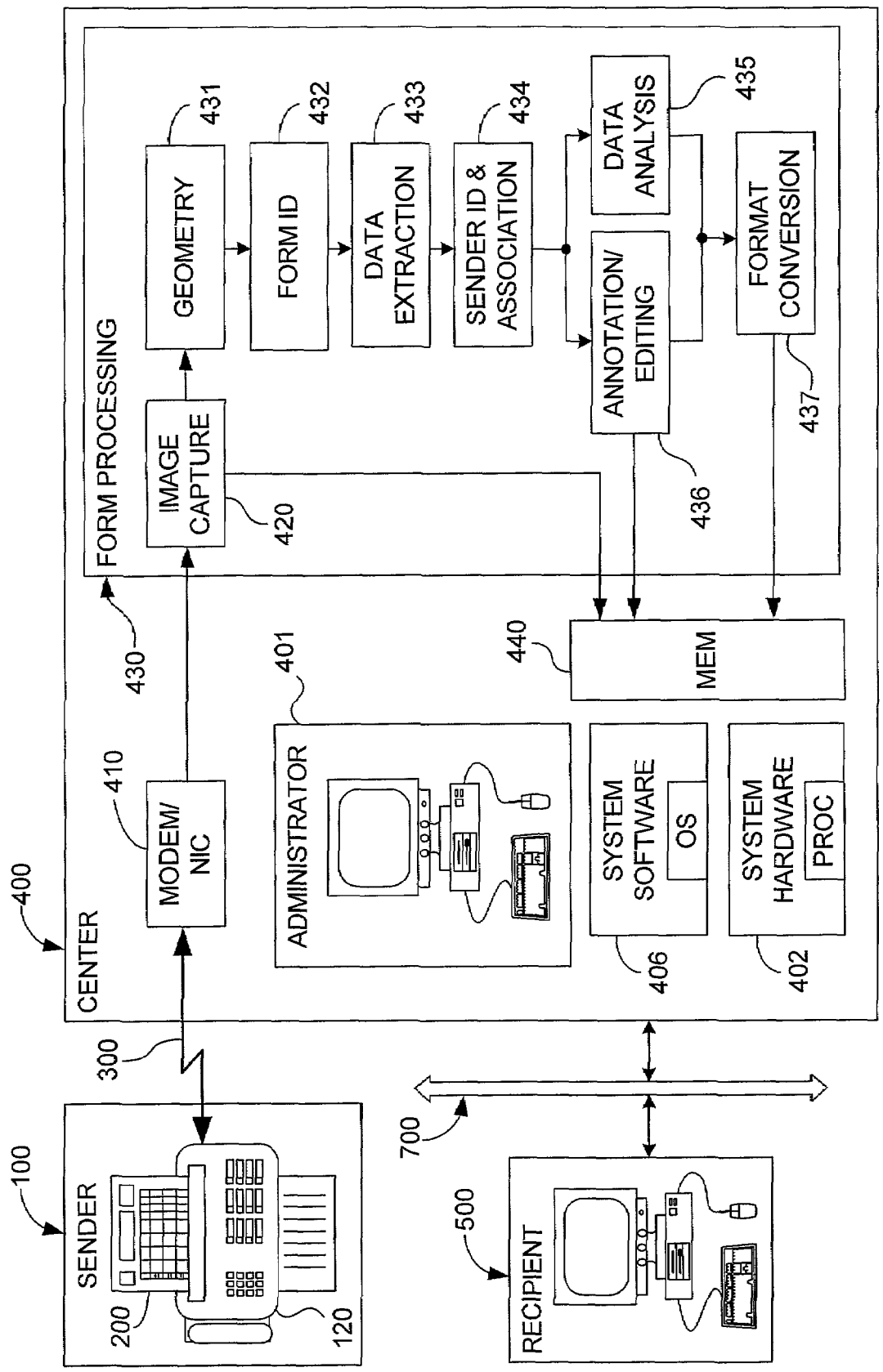
FIG. 1 is a block diagram that illustrates the main hardware and software components of a basic embodiment of the system according to the invention.

FIG. 1 is a block diagram of the main hardware and software components of a basic embodiment of the invention. In this embodiment, it is assumed that a sender 100 is to transmit some kind of report to a central system 400 ("central server" or simply "center"). The sender does this by recording the information to be reported on a form 200, which is then sent using a transmission device 120, via a channel 300 to the central system 400. Upon receiving the transmitted form, the center then processes it in order to extract the data from the form and, after optional further processing, store it in a data base. Before the individual hardware and software components of the invention are discussed in greater detail, these terms and concepts are first explained.

The sender 100 will be any person or group that needs to report information to the center 400. Note that this invention may be used with any number of senders. In the most commonly anticipated use of the invention, the sender will be an employee who needs to report time worked, or some other parameter such as travel expenses, a vacation request, sales, inventory, etc. or any combination of such parameters. The sender may, however, also be someone not directly associated with the center, such as a vendor submitting a bill or a customer submitting an order, such that the center acts as an intermediary.

The transmission device 120 is preferably a conventional facsimile ("fax") machine. There are several advantages to using a fax machine. First, whereas not all workplaces have convenient Internet connections, almost all have at least one fax machine. Second, almost every sender in the modern work environment will be familiar with the use and operation of a fax machine. Third, the channel 300 used by a fax machine is usually the public telephone network, which allows not only for a dedicated, point-to-point connection with the center 400, but also is generally more reliable than a non-dedicated network such as the Internet. Fourth, all modern fax machines provide an easily understood, immediate confirmation of successful transmission or of failure. Fifth, sending fax machines also usually transmit identifying information such as the telephone number from which they are transmitting. This makes it possible for recipients, such as the center 400, to identify the source of a transmission.

It would also be possible, however, to use the invention with other transmission devices than a fax machine and other connections than a telephone line. One possible alternative, for example, would be to use a conventional computer to which a scanner is connected. The sender could then scan in the completed form he wishes to send, then transmit the file in some predefined format to the center, for example as an attachment to electronic mail ("e-mail"), directly as a bit-mapped file using fax-modem software, etc. In this case, the transmission channel 300 could involve a network other than, or in addition to, the telephone system, such as the Internet or a dedicated network (an "intranet") within an enterprise. Note that a fax machine itself embodies a scanner, and as such acts primarily as a combination of a scanner and a modem. All that is required to use the invention is some device that allows a physical form to be converted into an electronic representation that can be transmitted to the center 400; moreover, the transmission channel 300 may be wired, such as a telephone line, or wireless.

The form 200 may, likewise, be of many different types. In the most common use of the invention, the form will be a conventional paper form (one or more sheets) on which the parameter(s) to be reported is marked in some visible manner, along with optional associated information such as the sender's identification, signature, etc. Each parameter to be reported is preferably amenable to quantification or itemization on a list in order to improve the system's ability to interpret its value correctly and unambiguously. For example, time can be reported in hours and minutes; inventory can be reported by marking an item number and a quantity; orders can be reported by marking a box next to the name of the desired items, along with a quantity; performance can be itemized as "excellent," "good," "acceptable," "unacceptable," etc.

Handwritten or printed comments, on the other hand, or signatures, cannot be itemized or quantified as readily, if at all. As is discussed further below, however, the invention allows such information to be included as well, although it will typically not be processed in the same way as information that can be quantified or itemized.

The sender 100 will usually be remote from the center 400. Note that the term "remote" does not necessarily imply distance, but rather, in the context of this invention, simply that the form is converted into an electronic representation and is transmitted over some channel to the center in some way.

In the simple embodiment of the invention shown in FIG. 1, the center 400 is the recipient of the transmitted form 200. This would be the case, for example, where the center is in the payroll department of a large company and is used to process time sheets sent in by off-site employees. It would also be possible, however, for the center to act as an intermediary for other parties who are the ones primarily interested in the data extracted from the forms transmitted from different users. Extracted data can then be transmitted (according to a known schedule or in response to a request) to the other recipient parties in any conventional manner, for example in the form of a summary, a detailed report, one or more electronic files in a chosen formal, etc., or any combination of such methods. For example, FIG. 1 shows one recipient 500, which communicates with the center 400 in any conventional manner via a network 700 such as the Internet. Parties to whom the center-collected data is transferred may then process this data in any way they see fit, from a simple review of a report to a full-scale analysis of the reported parameter (such as time worked) using other applications.

FIG. 1 also shows the preferred structure of the center 400, which may be configured as a conventional computer system controlled by a system administrator 401. As in other computer systems, the center 400 includes system hardware 402 with at least one processor (PROC), system software 406, such as an operating system (OS), device drivers, etc., and one or more memory devices 440, which may be any combination of high-speed, volatile devices such as RAM memory and mass storage devices such as disks.

The center also preferably includes a conventional network connection and I/O device 410 such as a modem and/or network interface connector (NIC), depending on the type(s) of transmission channel(s) 300 used to send forms. As is well known, the connection device 410 serves as an interface between the channel 300 and the system hardware and software and transforms a data stream suitable for transmission over the channel into a corresponding data stream that can be processed within the center, and vice versa. The function of a modem and NIC is well known and is therefore not described further here.

In order to convert the transmitted form into data suitable for processing, the center 400 includes an image capture module 420. This module may be implemented with existing technology, and converts the data stream received by the modem/NIC component 410 into a file containing a digital representation of the image of the sent form. Known fax-server software performs this function, for example, by receiving a fax and converting it into an image file in any of several standard formats, such as TIF, GIF, JPEG, HTML, or a standard bit-map. All that is needed according to the invention is for an image of the transmitted form to be generated such that the various data fields of the form can be located and interpreted. As FIG. 1 illustrates, the output from the image capture module 420 is preferably stored directly in the memory 440 for later retrieval of the raw image as received from the sender.

As everyone who has ever received a fax knows, the faxing process often skews and warps the document faxed, and noise and inaccuracies often corrupt the image further. In addition, most modern fax machines deliberately compress the transmitted image in order to make room to add a header. In essence, a form 200 can be considered to consist of an outer boundary, within which information is made visible in different fields, that is, portions of the form. The faxing process can distort not only the outer boundary, but also the absolute and relative positions of the fields, as well as their shape. Before data can be extracted from the various fields of the form, it is therefore necessary to identify where the fields are.

The form processing module therefore includes a sub-module 431, which determines the geometry of the received form image. Any known registration algorithm may be used to perform this function, and there are several commercially available image analysis routines that are suitable for use in the invention. Many algorithms are known, for example, that locate certain predetermined geometric shapes such as rectangles.

Other algorithms are more general, and match a given image with one or more templates. This is the preferred algorithm in the invention, since it does not restrict the layout of the forms as much as simple shape-location routines. Typically, these algorithms compare the test image (in this case, the received image) with a template and then uses known mathematical techniques to find a match that is the "best" in some predetermined sense, which is usually the minimization of an "energy" or "cost" function. For example, if each image (the test image and the template) is represented as a matrix of picture elements ("pixels"), then the pixel matrices can be compared element-by-element, for example, by forming the absolute value of the difference in their gray-scale values. For binary, bit-mapped comparisons, a similar result can be obtained by performing a logical "NOT XOR" operation. The test image and template are then mathematically (usually through changing the indexing) translated, rotated, and, in the most advanced algorithms, warped (similar to a technique known as a "rubber sheet transformation"), relative to each other until the sum of the absolute difference values (either as is or squared) is a minimum.

These algorithms are mathematically similar to holding the form and the template up to a light on top of each other, and then, while looking through both, shifting them until they appear to "line up." In short, the geometry module 431 performs a registration of the received form image with one or more templates, which are pre-stored in memory. In order to aid registration, the forms may be provided with one or more registration markings. The process of registration can then often be speeded up by using the markings as guides. If several markings are provided at different locations over the surface of the forms, with known separations and orientations, then the markings may also be used to compute local "dewarping" factors that can be applied to the pixels in a region near the markings.

In the simplest case, there will be only one template that all transmitted forms correspond to. In some applications of the invention, however, there may be many different types of forms, for each of which there is a corresponding template. One way to determine which template is to be applied is to establish a different telephone number (or network address) for all senders who are using the same form; the telephone number to which the form is sent then also identifies the proper form template. Another, automatic method is to compare each received form image with all the templates, only one of which (presumably, the correct one) will minimize the differences with the form image. Yet another method would be to use the identification feature of modern fax machines: The standard transmission protocol of a fax usually includes the telephone or station numbers of the sending and receiving devices; if specific templates are associated with certain sending devices, then the number of each sending device 120 can be used to select the appropriate template. The form processing module 430 therefore includes a form identification sub-module 432 that implements any known routine, such as those described, to determine which form has been received from a sender. Note that the form identification sub-module may be eliminated if only one form is ever used, or it may be incorporated into other sub-modules.

Regardless of the chosen registration and form-identification routines, once the received form image has been registered with a template, the locations of the different data fields will be then also be known. The actual data contained in the different data fields can then be extracted, also using known technology, in a data extraction submodule 433. Several methods for data extraction are known as "optical character recognition" (OCR), which typically recognizes alphanumeric symbols and converts them into corresponding ASCII (or equivalent) character sets; "intelligent character recognition" (ICR), which typically also attempts to recognize non-standard fonts and even handwriting; "optical mark recognition" (OMR), which determines whether a data field (such as a check box, rectangle, circle, etc.) is filled in or blank; and various combinations and variations of these basic concepts.

Once the data on the form has been located and extracted, it will normally need to be analyzed in one or more ways. The analysis will also often depend on which entity or entities are to be the ultimate recipients of the result of the analysis. For example, if the form is a time sheet, then the analysis may be different for exempt as opposed to non-exempt employees, that is, those for whom overtime must be paid and those who are on a fixed salary regardless of hours worked. Hours worked each day during a pay period will, for example, normally need to be summed, or hours worked for an entire period may need to be associated with different projects. The form processing module therefore includes a data analysis sub-module 435 that is programmed using normal techniques to perform whatever analysis is required in each case.

Depending on the circumstances, it may also be desirable to be able to add notes or otherwise edit the form data. A corresponding processing sub-module 436 may therefore be included to allow this. For example, if an employee is reporting time taken as vacation, and that employee has exceeded his available vacation time, then a notation to this effect may be made in the data file in order to flag this for a manager. One or more parties in addition to the sender (in particular, a recipient 500) may also wish to add notations or comments to form data, in particular, to data once it has already been stored in the memory 440, as is indicated in FIG. 1 by the direct connection between the sub-module 436 and the memory. In such a multi-party embodiment of the invention, parties 500 may contact the center 400 and, after authentication using a password, add notes to the file into which a form is converted. These notes may be textual, but preferably also include notes in the form of attached audio files, for example in the widely used ".wav" format.

Once a form's data has been extracted and analyzed as needed, it will normally need to be stored in a format suitable for later retrieval and further analysis and annotation. Different parties may also request data storage in different formats. One party may, for example, want to be able to retrieve data into a spreadsheet such as Microsoft Excel whereas another may want to retrieve data in Quick-Books format. In order to allow the center to adapt to the needs of external parties, rather than forcing them to accept a formatting decision used in the center, the form processing module 430 according to the invention preferably includes a format conversion sub-module 437 that converts the data from whatever format is chosen to initially represent extracted data (preferably, a generic format) to any of one or more predefined formats before storing the data in memory 440.

Alternatively, all data could be stored in memory in a format chosen to meet the needs or preferences of the center 400, in which case the format conversion submodule could be invoked to reformat stored data only when it is to be exported to another party. Note that in the case where an external recipient (such as recipient 500 illustrated in FIG. 1) receives form data from the center via the Internet, this means that, once the sender transmits a form 200, preferably via fax, all processing is carried out automatically—with no need for manual data reentry or other human intervention—even to the point of transferring the data via the Internet for subsequent processing.

The sub-modules 431–437 may all be implemented using known programming techniques with conventional hardware support as needed in any given application.

Figure 2:
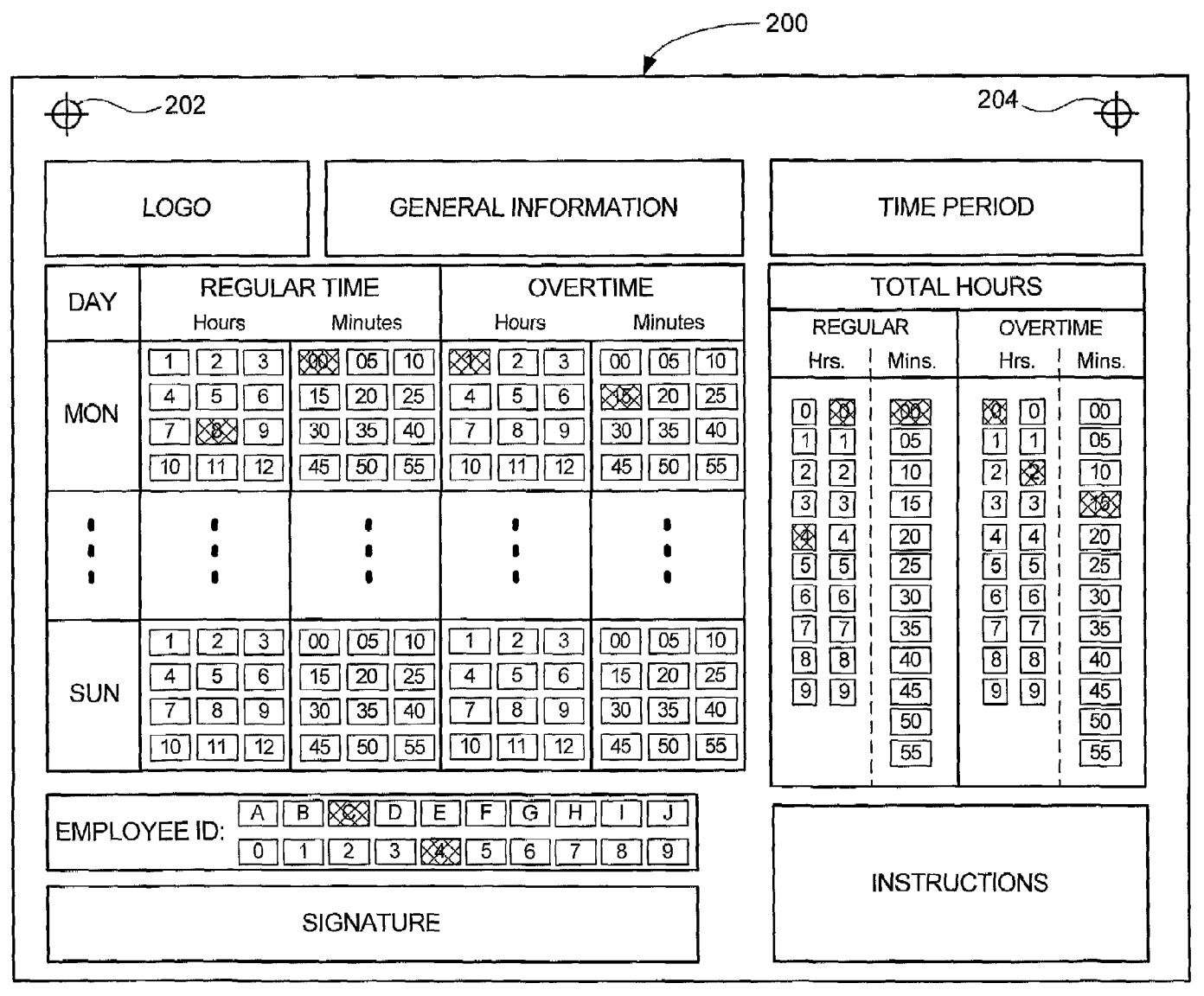

FIG. 2 illustrates one example of a possible form that could be used in the invention. In practice, of course, each user of the system will usually have unique requirements and specifications for the form(s) they will use. The invention is able to accommodate any forms that, as is mentioned above, have data fields in which possible values of parameters to be reported can be quantified or itemized.

The form example shown in FIG. 2, however, resembles in structure a form used successfully in tests of a prototype of the invention, in that it allowed for accurate data extraction when transmitted from several different conventional fax machines. As the various headings indicate, this example form is set up to enable reporting of time worked over the course of a seven-day week. In this example, hours worked each day are indicated on a row of entry fields, with columns for the day, as well as for the parameters "Regular Time" and "Overtime." For the sake of clarity, the data entry rows and columns are shown larger than they were on the test form used in the prototype of the invention. Moreover, the rows for data entry for the days Tuesday through Saturday have been omitted from FIG. 2, because of space constraints and again for the sake of clarity. The actual layout of the form will depend on the needs of the users; the invention does not require any particular layout or headings. Note, moreover, that a form may consist of more than one page.

The illustrated form includes several fields that are preferably pre-printed when the form is delivered to the sender (for example, at the beginning of a pay period for which he is to report time worked). Examples of such fields are fields for a logo, general information and instructions.

A field is also shown for the sender's signature. This will of course usually not be readable by any recognition software, but this is not necessary according to the invention. Rather, recall that an image of the sent form is preferably stored as is in the memory 440. If a user (either the administrator 401, or an external party such as a payroll clerk or manager at the sender's employer, etc.) later wishes to verify that the form was properly signed, then the user will be able to retrieve not only the analyzed data file, but also the original image, on which the signature will appear. This is of course also the case for any other visible feature of the form.

When using the illustrated form, the sender enters data by darkening small data "boxes," each of which is a corresponding data field. Thus, any amount of time can be indicated, in five minute increments, by darkening the appropriate boxes, for example, using a pencil or suitable pen or marker. The sender similarly indicates such information as what his employee ID number is. In FIG. 2, the sender has thus marked that he is employee C4 and that, on Monday, he worked exactly eight regular hours and one hour fifteen minutes of overtime. His weekly total was 40 regular hours and two hours fifteen minutes of overtime.

The illustrated form also shows a block "Time Period." This may be preprinted, or it, too, may be designed with data boxes that the sender can darken; this would allow copies of a single form to be used over many time periods.

The form shown in FIG. 2 also illustrates how registration marks, such as marks 202, 204, may be included on the form as aides to image registration and location of the data entry fields, that is, the data boxes. Another field (not shown) may also be included to identify the form and perhaps even the entity (for example, employer) associated with the report; for example, when the form is created and delivered to the user, a bar or other standard code that is easily decipherable by software could be included in a form field to aid form identification.

As part of the data extraction process performed by the sub-module 433, for example, the optical mark recognition, the form processing system according to the invention will sense which boxes the user has darkened. Because the form will have been registered with a template, the darkened boxes can be readily associated with the correct data values for the different parameters to be reported. The data analysis submodule 435 may then also carry out such computations as calculating the total hours reported as worked, which can then be stored along with the other form data in memory. The calculated total can then be checked against the value the sender himself has entered. If the calculated sum does not match the sum the user entered in the "Total Hours" block, then an annotation to this effect can be made in the stored data file and the administrator can be notified that the form is invalid because of at least one identified error. The sender can then be instructed in any known manner to send a correctly completed form.

Tests have indicated that "boxes" such as those illustrated in FIG. 2, with the values shown within each respective box, were easy to use and understand, and could be recognized by software with very high reliability. Other types of data entry fields may of course be used instead. For entering time, for example, two small clock shapes labeled "hours" and "minutes" could be printed on the form; the sender could then draw hour and minute "hands" in the respective clock figures to indicate time. A single clock figure could be used instead, on which the user draws in both hour and minute "hands"; to aid in the distinction, an inner ring could be included to indicate the proper length of the hour hand, the outer ring of the clock indicating the proper length of the minute hand.

As yet another alternative for entering numerical data such as how many of a particular item the sender wishes to order (or report), the form could include data entry boxes for units, tens, hundreds, etc. Each box could then include light, dotted or dashed lines oriented to correspond to the segments of a conventional seven-segment display. By darkening the appropriate segments, the sender can "print" the numbers in an unambiguous, handwriting-independent manner. Such data entry boxes have been used successfully for many years for automatic optical reading of postal codes on mailed envelopes in several Eastern European countries.

We claim:

1. A method for collecting reports of at least one parameter comprising the following steps:

all in a central computer system:

automatically receiving from any of a plurality of arbitrary senders, via a publicly accessible transmission channel, an electronic representation of an image of a physical form, the form having a plurality of data fields, each corresponding to an indicator, which may be alphanumeric, of at least a partial value of at least one of the parameters;

automatically and uniquely identifying the physical form from the electronic representation of its received image;

automatically identifying the location of the data fields in the received representation of the image of the form by comparing the received electronic representation of the image of the physical form with at least one pre-stored electronic representation of at least one template;

automatically extracting from the identified data fields the at least partial values of the corresponding parameters; and automatically storing the extracted values in a predetermined format in a memory for subsequent processing as well as the representation of the received physical form as it was received; and transferring the stored extracted values to an external recipient via a network, all processing of the physical form after transmission by the sender up to and including transfer to the external recipient via the network thereby taking place automatically;

in which:

the electronic representation of the image of the physical form is generated using a standard, conventional facsimile machine, whereby the transmission channel is a standard telephone line and the central computer system is separate from the facsimile machine other than though its connection via the transmission channel;

each data field indicates a quantifiable or itemizable value of a corresponding one of the parameters, further including the additional step of storing the received electronic representation of the image of the physical form in the memory, whereby non-quantifiable and non-itemizable entries by the user onto the physical form are made available for subsequent review;

the step of automatically identifying the location of the data fields comprises the following sub-steps:

storing an electronic representation of a template of each of a plurality of physical forms;

automatically identifying each received form by performing a best-fit comparison of each received electronic representation of the image of the corresponding physical form with the stored electronic representations of the templates;

automatically registering the received electronic representation of the received physical form image with the best-fit electronic template representation; and matching the data fields in the received electronic representation of the received physical form image with corresponding data fields in the best-fit electronic template representation.

* * * * *